May 27, 1941.　　G. E. BEHARRELL ET AL　　2,243,520
SAFETY VALVE FOR PREVENTING ACCIDENTAL OPERATION
OF AUTOMATIC GUNS ON AIRCRAFT
Filed June 26, 1939　　4 Sheets-Sheet 1

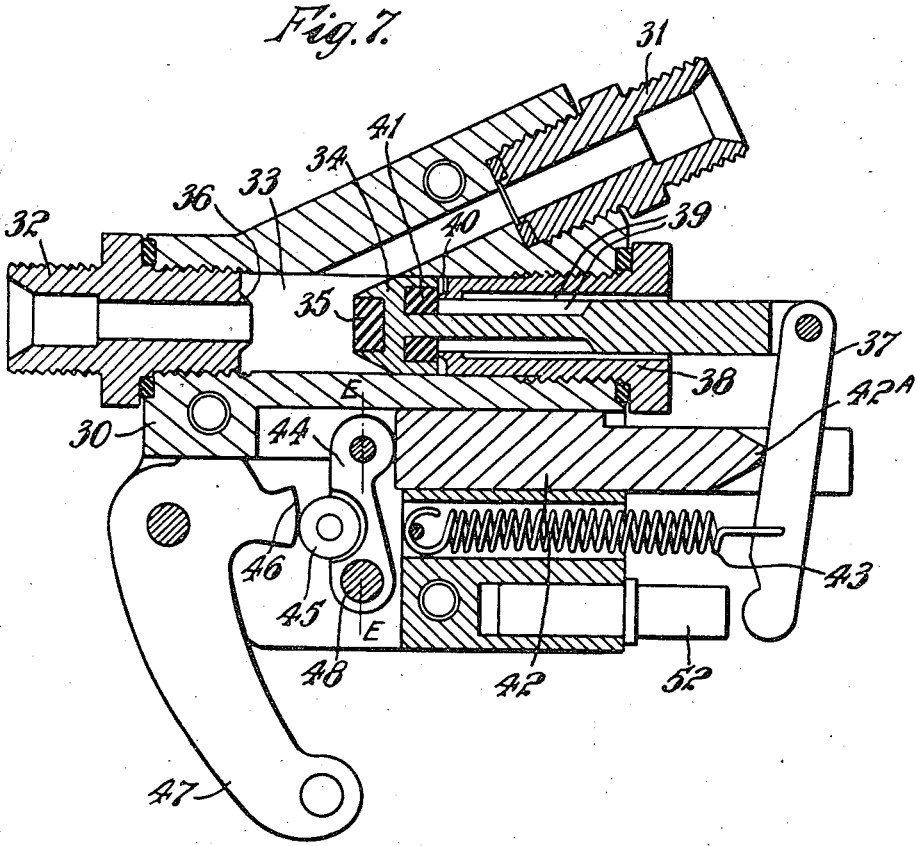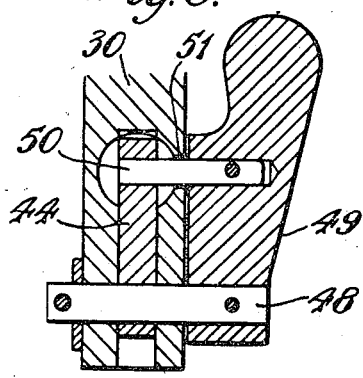

Patented May 27, 1941

2,243,520

UNITED STATES PATENT OFFICE 2,243,520

SAFETY VALVE FOR PREVENTING ACCIDENTAL OPERATION OF AUTOMATIC GUNS ON AIRCRAFT

George Edward Beharrell, Streetly, Joseph Wright, Birmingham, and Henry Trevaskis, Sutton Coldfield, England, assignors to Dunlop Rubber Company Limited, London, England, a British company Application June 26, 1939, Serial No. 281,118
In Great Britain June 25, 1938

16 Claims. (Cl. 89—27)

(Granted under the provisions of sec. 14, act of March 2, 1927; 357 O. G. 5)

This invention comprises certain improvements in or relating to safety devices for preventing accidental operation of automatic guns on aircraft.

In the usual arrangement, each gun is coupled to a fluid pressure system incorporating a firing button valve device so arranged that when the button is depressed, the gun firing mechanism is operated. Thus there is a liability that the gun or guns may be accidentally fired when the aircraft is on the ground. The present invention seeks to overcome this defect in a simple and efficient manner.

According to the present invention a safety valve device is incorporated in a fluid pressure system including a gun or guns, and a firing or control button, and in which means are provided on the aircraft which are adjustable either to a position enabling the aircraft to land and/or take-off or to a position normally occupied when the aircraft is in flight, the said means coacting with the safety valves so that the safety valve is automatically operative to prevent the firing of said gun or guns when the said means are adjusted to the first mentioned position.

In one form of the invention the safety device is operated to effect an opening and closing of a valve member by hydraulic pressure derived from the operation of hydraulic jack mechanism for raising and lowering a retractable undercarriage on the aircraft, the arrangement being such that when the under-carriage is lowered in readiness for landing the aircraft, the safety valve is automatically closed to prevent operation of the gun or guns, whilst when the under-carriage is raised, the safety valve is automatically opened to permit the gun or guns to be fired.

In another form of the invention, the safety device comprises a slidable valve for controlling a supply of air under pressure to the gun or guns, a slidable plunger or the like for operating said valve, means connected to the under-carriage jack control for moving said plunger axially, and spring means for normally returning the valve to a position cutting off the supply of air to the gun or guns.

In order that the gun or guns can be temporarily operated whilst an aircraft is grounded, for testing of the guns and for other purposes, hand operated means are provided for opening the safety valve. This hand operated mechanism is independent of the mechanism operated by hydraulic pressure and is also preferably spring loaded and arranged so that it is ordinarily necessary to hold the valve open by hand whilst the gun firing button is operated, whereby the safety valve is automatically closed immediately the hand control is released.

The various features of the invention are illustrated by way of example in the accompanying drawings, in which—

Fig. 7 is a sectional elevation of a modified form of the invention, and

Fig. 8 is a section on line E—E of Fig. 7.

Figure 1:
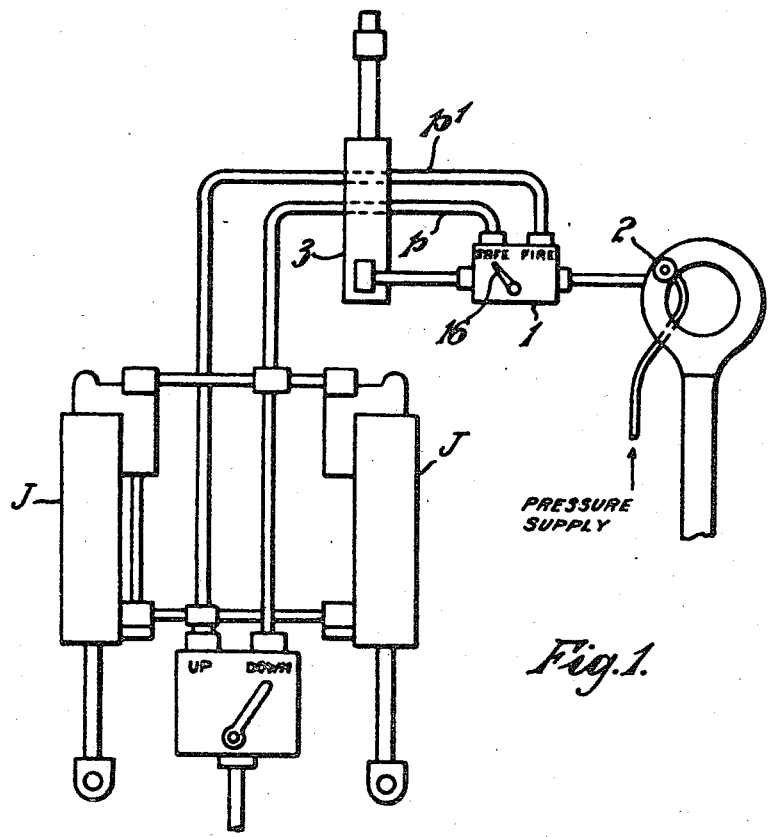
Fig. 1 is a diagrammatic representation of the apparatus and system embodying the present invention.
Figure 2:
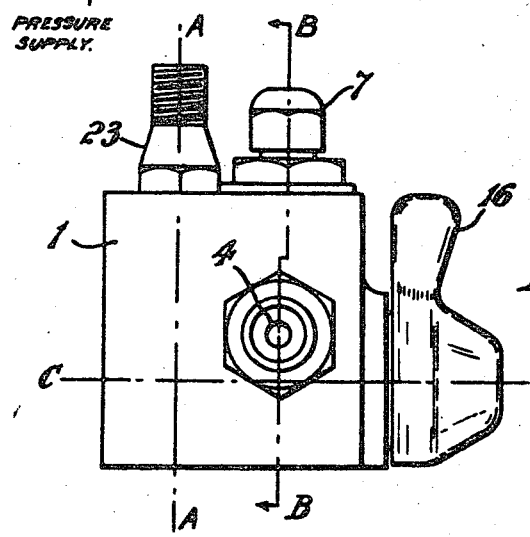
Fig. 2 is a side elevation of the safety valve device constructed according to this invention.
Figure 3:
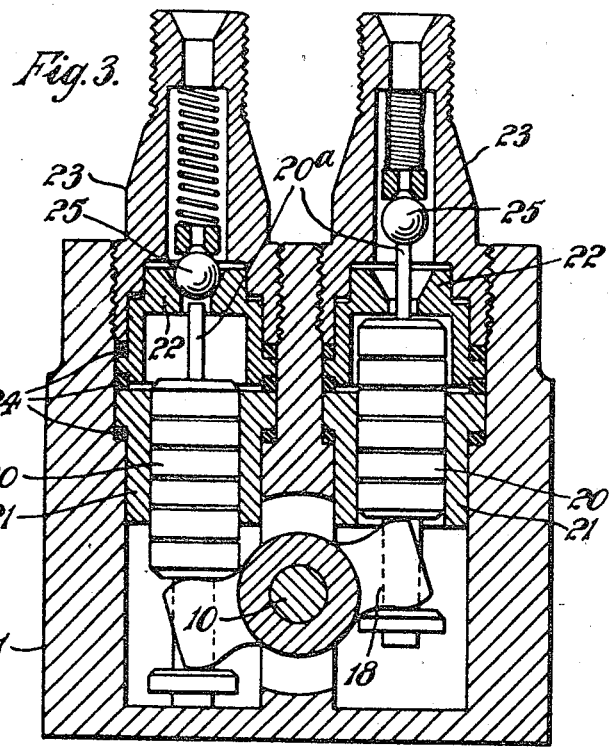
Fig. 3 is a sectional elevation on the line A—A of Fig. 2.
Figure 4:
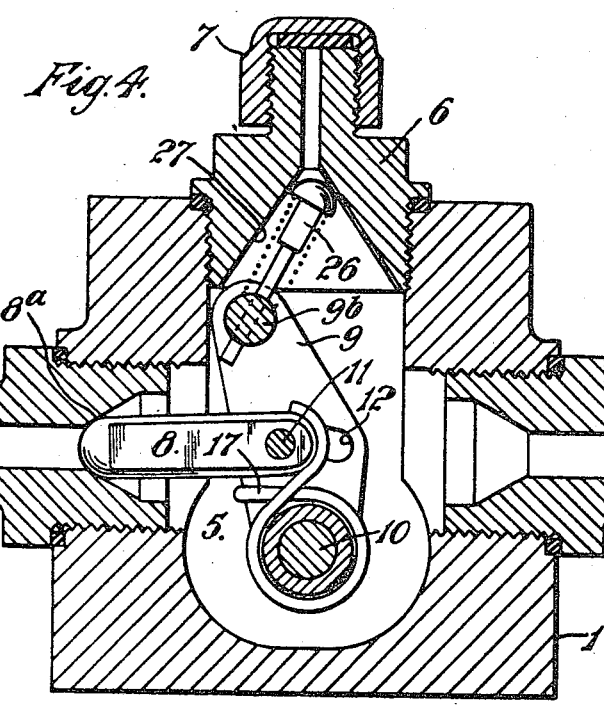
Fig. 4 is a sectional elevation on the line B—B of Fig. 2.
Figure 5:
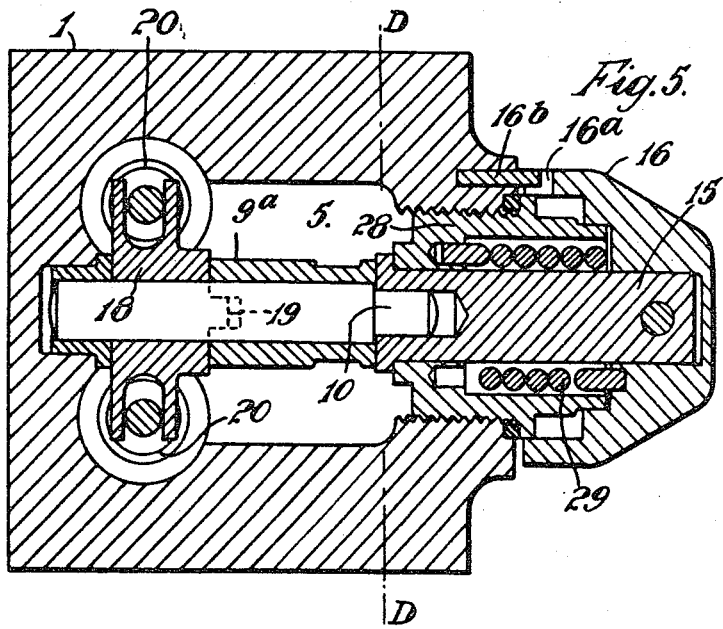
Fig. 5 is a sectional plan view on the line C—C of Fig. 2.
Figure 6:
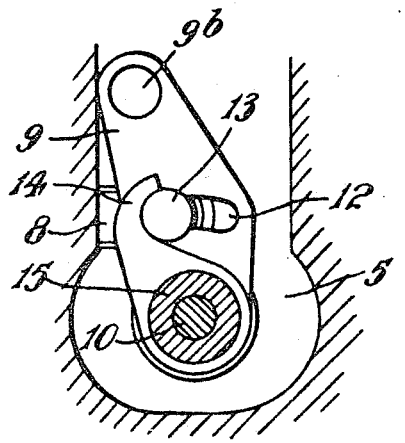
Fig. 6 is part sectional elevation at the line D—D of Fig. 5 and shows the hand operated means for opening the safety valve.

According to a convenient embodiment of the invention as shown in Figs. 1 to 6, the safety valve comprises a self-contained unit 1 which is fitted between the gun firing button 2 and a gun 3 or guns mounted on an aircraft. The device comprises a cube-shaped body member which has screw-threaded openings in each of two opposite sides into which are screwed union members 4 for receiving the fluid pressure pipes connected respectively to the gun firing button and to a gun or guns to be controlled thereby. An axial hole through each pipe union communicates at its inner end with a pressure chamber 5 in the body of the device, the axis of such chamber being vertical. The upper end of this chamber is closed by a hollow screwed plug 6, the opening through which is adapted to be covered by a screw cap 7, thus permitting the liquid pressure system to be bled of air.

The inner end of the hole through the pipe union 4 carrying the fluid pipe connected to the gun 3, is adapted to be sealed to cut off the supply of fluid pressure to the gun by means of a valve member 8 which has a spherical head for seating on a conical recess 8a in the pipe union, and the opposite end of this valve member is pivotally connected to a lever or member for moving the valve into the closed and opened positions. The said valve member 8 has flat sides, behind the spherical head, which engage between two upstanding arms 9 on a rocking lever which is rotatably mounted on a spindle 10 journalled in the body of the device and located horizontally across the base of the aforesaid vertical chamber 5.

The flat inner end of the valve member 8 is coupled to the rocking lever 9 by a pin member 11 passing transversely through an arcuate slot 12 in each lever arm and through a hole in the end of the valve member, so that when the rocking lever is moved in a clockwise direction about its pivot axis, the valve member 8 will be moved off its seat 8a. The said pin 11 coupling the valve member to the rocking lever has an enlarged head 13 on one side which is adapted to be engaged by a catch piece 14 fixed to a spindle 15 arranged coaxially with the first mentioned spindle carrying the rocking lever 9, and such second spindle is adapted to be rotated by hand, by means of the finger piece 16, for the purpose of moving said valve member 8 off its seat. A torsion spring 17 surrounds the boss of the rocking lever 9 and has one end anchored to an arm thereon, whilst the other end bears on the back or inner end of the valve member 8 to normally press the same onto its seat 8a.

The rocking lever 9 for operating the valve is adapted to be pivoted by virtue of its connection to a double armed lever 18 which is freely mounted on the spindle 10 carrying the rocking lever, and the two lever members 9 and 18 are non-rotatably coupled together by dog projections 19 on the boss of the double armed lever 18 engaging notches in the boss 9a of the rocking lever 9. The outer ends of the two arms of the double lever 18 are bifurcated for engagement with the spindle portions of two plunger members 20 slidably supported in the body of the device and arranged vertically and behind the aforesaid air-bleeding cap.

Each plunger has a cylindrical portion which has a series of circumferential grooves therein so that whilst it can be accurately fitted in bush members 21 secured in the body of the device, a certain amount of lubricant is retained on the surface of the plungers. A hollow cap member 22 is fitted concentrically with each of the said plunger bushes 21 and these two cap members and the bushes are held in the body 1 by means of screwed union members 23 to which are coupled pipes carrying fluid under pressure. Suitable sealing rings 24 are fitted between said bushes and the cap members, to prevent leakage of fluid.

Each hollow cap member 22 is adapted to be closed by a spring pressed ball 25 which seats on a conical opening through the top of the cap. Each plunger 20 is provided with an upstanding stem 20a which, in one position of the plunger, passes through the opening in the cap 22 and lifts the ball 25 off its seating.

A pipe P is coupled to the latter union 23 and is also connected to a fluid pressure pipe for supplying fluid under pressure to the upper end of a pair of hydraulic jack devices J for lowering the retractable under-carriage of the aircraft, whilst another pipe P¹ connected to the other pipe union 23 is coupled to a pipe supplying fluid to the lower end of said jack mechanism for raising the under-carriage mechanism into a retracted position.

Thus if the under-carriage is moved from one position to another, the flow of fluid under pressure through the pipes connected to the jack mechanism causes one of said plungers 20 to be depressed and, due to its connection to the bifurcated lever 18, the other plunger will be raised. There is thus a partial rotation of the double armed lever 18 and this causes a corresponding movement of the rocking lever 9 carrying the valve member 8.

Means are provided for retaining the rocking lever 9 in either a position holding the valve 8 closed or open independently of the fluid pressure which has caused the lever to be moved. This is effected by means of a spring toggle device carried by the rocking lever and comprising a pin 26 which has a spherical head engaging the top of a conical recess 27 in the aforesaid air-bleed plug 6 closing the top of the vertical chamber in the top of the device, such toggle pin having a portion of reduced diameter which slidably engages a hole diametrically through a distance piece 9b between the two arms of the rocking lever 9. A coiled compression spring is located between the spherical head on said toggle pin and the distance piece or head of the rocking lever. Due to the abutment of the spherical head against the closure plug 6, the spring tends to force the rocking lever 9 either to one side or to the other, and thus hold the valve member 8 in the open position, or in the closed position.

The hand lever or finger piece 16 for operating the valve independently of the operation by hydraulic pressure, comprises a circular boss portion which is pegged to the spindle 15 journalled in a bush 28 screwed in the front of the body of the device, such spindle being also journalled on a reduced portion of the spindle 10 carrying the rocking lever 9 and double armed lever 18. A torsion spring 29 surrounds the spindle 15 and such spring has one end anchored to the said bush 28, whilst the other end is anchored to the boss of the hand lever or finger piece 16 and, therefore, the lever is normally returned to the position allowing the control valve 8 to close. The back of the lever or finger piece has an arcuate groove or opening 16a which coacts with a stop peg 16b fixed to the body of the device to limit the rotational movement of the hand lever.

By this invention it normally is impossible for the gun 3 to be accidentally fired when the aircraft is on the ground owing to the fact that when the under-carriage is lowered, fluid pressure is applied to one of the plunger devices 20 for moving the double armed lever 18 in an anticlockwise direction, thus effecting a movement of the rocking lever 9 carrying the valve 8, into a position in which the pipe which supplies fluid under pressure to the gun 3 when the gun button 2 is depressed, is positively closed and, therefore, should the gun button be accidentally depressed, there will be no accidental firing of the gun.

Immediately the under-carriage is raised, when the aircraft is in flight, the fluid pressure derived from the operation of the under-carriage jack mechanism causes the second plunger device to be moved to tilt the double armed lever in a clockwise direction, thus positively opening the orifice controlled by the valve member 8 and permitting fluid under pressure to flow to the gun 3 when the gun button 2 is depressed.

A further feature of the invention consists in the provision of the hand operated means allowing the gun to be operated for testing or other purposes when the aircraft is on the ground. A rotary movement of the finger piece or hand lever 16 causes the catch 14 on the spindle 15 to coact with the enlarged head 13 of the pin 11 and move same along the arcuate slot 12 in the lever 9. Thus the valve member 8 is moved axially away from its seating 8a and the fluid pressure conduit is opened without moving the lever 9 about its pivot axis, and therefore the toggle device 26 does not come into operation. The springs 17 and 29 ensure that it is necessary for the operator to hold the hand lever 16 in the "fire" position, and immediately such lever is released, the valve member 8 moves into the closed position.

According to a modified form of the invention as shown by Figs. 7 and 8, the safety valve device is adapted for use in a pneumatic system of gun control mechanism and comprises a self-contained unit which is fitted between the gun firing button and a gun or guns mounted on an aircraft.

The device comprises a body member 30 which has screwthreaded openings in two sides into which are screwed union members 31 and 32 for receiving the fluid pressure pipes connected respectively to the gun firing button and to a gun or guns to be controlled thereby. An axial hole through each pipe union communicates at its inner end with an open chamber 33 in the body of the device, the axis of such chamber being horizontal.

The inner end of the hole through the pipe union 32 carrying the air pipe connected to the gun, is adapted to be sealed to cut off the supply of air under pressure to the gun by means of a valve member 34 which has a rubber or other resilient sealing block 35 in the forward end for seating on a raised or ridge seat 36 surrounding the bore of the pipe union 32, and the opposite end of this valve member is pivotally connected to a link member 37 for moving the valve into the closed and opened positions. This valve member slides in a bush 38 screwed into the body of the device, and the bush and the stem of the valve member each has axially arranged grooves 39 through which the air exhausted from the gun or guns escapes to the atmosphere, as hereinafter described. The inner end of the guide bush 38 has a raised or ridge seat 40 surrounding the hole through the bush, and such seat is adapted to be closed by means of a rubber or other resilient sealing member 41 located in a groove in the head of the valve member 34.

The body member 30 has a plunger 42 slidably mounted therein below the aforesaid valve member and parallel thereto. One end of this plunger projects from the body of the device and has a notch at the outer end which receives the aforesaid link 37 carried by the valve member. The bottom of the notch is chamfered to form a knife edge 42a which bears against the inside edge of the said link. The link is held in contact with the slidable plunger 42 by means of a tension spring 43 located below the plunger, and such spring has its ends anchored respectively to the link and to a peg passing transversely through the body member.

The inner end of the slidable plunger 42 contacts a curved toe portion on a lever 44 which is pivotally mounted inside a notch in the body of the device, and this lever has a roller 45 freely mounted thereon at a point intermediate its ends. This roller contacts a cam shaped portion 46 of a lever 47 which is pivotally mounted between bifurcated lugs on the body of the device, and the outer end of this lever is linked to manually operated means for controlling the raising and lowering of the under-carriage of the aircraft.

The pin 48 on which the lever 44 is pivoted is extended to project from the body of the device and has a finger piece 49 non-rotatably fixed thereto, and this finger piece is also connected to the upper end of the lever 44 by means of a pin 50 which passes through an arcuate slot 51 in one side of the body member. This finger piece is for the purpose of moving the plunger 42 and the valve 34, to open such valve, and thus enable the gun or guns to be fired when the aircraft is grounded.

Assuming the aircraft to be in flight and the under-carriage fully retracted, the slidable valve 34 is at the right hand end of its stroke, as shown in Fig. 7, and the exhaust openings 39 in the valve and guide bush are closed by the rubber or like sealing washer 41 in the valve head. The air passage leading from the pipe union 31 coupled to the gun control button is open to the chamber 33 in front of the valve, as is also the pipe union 32 coupled to the gun or guns. The first mentioned passage is arranged at an inclination to the axis of the chamber 33 and it points towards the outlet from the chamber, i. e., towards the gun or guns, so that there is a minimum of obstruction to the flow of compressed air from the control button to the gun or guns.

When landing the aircraft, the movement of the control for operating the under-carriage jacks effects, through suitable linkage, an anti-clockwise movement of the cam lever 47 about its pivot axis, and this causes the lever 44 which carries the roller 45 to also move in an anti-clockwise direction about its pivot axis, thus allowing the slidable plunger 42 to move inwards due to the pull of the tension spring 43 on the link contacting the plunger. The inward movement of the plunger first causes the free end of the link 37 to move inwards to contact a stop peg 52 carried by the body of the device, and then the plunger 42 and valve member 34 move inwards together until the rubber or like sealing plug 35 in the head of the valve member contacts the ridge seat 36 and seals the orifice through the pipe union 32 connected to the gun or guns, thus cutting off the supply of compressed air from the control button to such gun or guns.

The inward movement of the valve member 34 automatically opens the exhaust openings 39 in the valve stem and guide bush, thus allowing the compressed air in the pipe and/or chamber between the gun control button and the safety device to escape to atmosphere. Thus the safety device constructed according to Figs. 7 and 8 is extremely simple and reliable in construction, and it enables pneumatically operated guns on aircraft to be controlled in accordance with the position of hydraulically operated under-carriage retraction jacks.

What we claim is:

1. Means for preventing accidental operation of automatic guns on aircraft which comprises a fluid pressure system for operating said guns, a firing control device acting on said system for operating said gun, a safety valve in said system to prevent the actuation of said gun from said firing control, a landing mechanism movable to landing and to flight positions and means actuated by said landing mechanism to move said safety device to safety position when said landing mechanism is in landing position.

2. Means for preventing accidental operation of automatic guns on aircraft which comprises a firing control for said gun, means for actuating said gun from said firing control and a safety mechanism in said means to prevent actuation of said gun from said firing control, landing mechanism movable to landing and to flight positions and means actuated by said landing mechanism to move said safety device to safety position when said landing mechanism is in landing position.

3. Means for preventing accidental operation of automatic guns on aircraft which comprises a firing control, a fluid pressure system to transmit pressure from said firing control to said gun, a safety device in said fluid pressure system to interrupt transmission of said fluid pressure from said firing control when in safety position, a hydraulic jack mechanism for raising and lowering a retractable undercarriage on the aircraft and hydraulic pressure mechanism to move said safety means to safety position when said retractable undercarriage is lowered to landing position and to release said safety mechanism when said undercarriage is drawn upwardly to flight position.

4. Means for preventing accidental operation of automatic guns on aircraft which comprises a firing control, hydraulic transmission means for transmitting pressure from said firing control to a gun to be operated, a safety device in said hydraulic transmission comprising a slidable valve to control the supply of fluid under pressure to the gun, a slidable plunger for operating said valve and undercarriage jack control for raising or lowering a retractable undercarriage for said aircraft and means connected to said undercarriage jack control for moving said plunger axially.

5. Means for preventing accidental operation of automatic guns on aircraft which comprises a firing control, hydraulic transmission means for transmitting pressure from said firing control to a gun to be operated, a safety device in said hydraulic transmission comprising a slidable valve to control the supply of fluid under pressure to the gun, a slidable plunger for operating said valve and undercarriage jack control for raising or lowering a retractable undercarriage for said aircraft, means connected to said undercarriage jack control for moving said plunger axially and spring means for normally returning the valve to a position cutting off the supply of fluid to said gun.

6. The apparatus of claim 4 and a manually operated spring loaded means to connect said gun control to said gun through said hydraulic system when said safety valve is in safety position.

7. Mechanism defined in claim 1, in which said safety valve comprises a fluid pressure chamber having inlet and outlet orifices, a valve member for controlling the flow of fluid into and from the said chamber and a pivoted lever for moving the valve member into closing positions.

8. Mechanism as defined in claim 1, in which said safety valve comprises a fluid pressure chamber having inlet and outlet orifices, a valve member for controlling the flow of fluid into and from the chamber, a pivoted lever for moving the valve member into closing positions, and in which said means to move said safety valve comprises fluid pressure means for operating said lever and means for automatically retaining the lever in the position to which it has been moved by the fluid pressure operating device.

9. The apparatus of claim 1 in which said means actuated by said landing mechanism to move said safety device comprises fluid pressure chambers, pistons slidably mounted in said fluid pressure chambers, a two-armed rocking lever coupled at its opposite ends to said pistons and means for transmitting the rocking movement of said lever to said safety valve, landing gear for said aircraft, and means controlled by said landing gear for moving said pistons.

10. The apparatus of claim 1, in which said means actuated by said landing mechanism to move said safety device to safety position comprises fluid pressure chambers, pistons slidably mounted in said fluid pressure chambers, a two-armed rocking lever coupled at its opposite ends to one respectively of said pistons and means for transmitting the rocking movement of said lever to said safety valve, a landing gear for said aircraft, means controlled by said landing gear for moving said pistons, a spring loaded ball valve for each of said pistons to control the flow of fluid into or from the pressure chamber of its respective piston, hydraulic mechanism for operating said landing mechanism and communicating with said ball valves and means on each said piston to open its respective ball valve.

11. Means for preventing accidental operation of automatic guns on aircraft which comprises a firing control, a fluid pressure transmission from said firing control to a gun to be operated, a landing mechanism movable to landing and to flight positions and means to move said safety device to safety position when said device is in said landing position, said safety mechanism comprising a valve member having a lateral projection, a lever having an arcuate slot to receive said projection and operating said valve member and a hand operated spring loaded catch piece to engage said projection and to open said valve.

12. The apparatus of claim 1 in which said means actuated by said landing means comprises a pivoted cam lever on the safety valve device and connected to said landing mechanism, a slidable plunger, a pivoted lever for moving said slidable plunger and a spring loaded link for operating said control valve from said plunger.

13. The apparatus of claim 1 in which said means actuated by said landing means comprises a pivoted cam lever on the safety valve device and connected to said landing mechanism, a slidable plunger, a pivoted lever for moving said slidable plunger, a spring loaded link for operating said control valve from said plunger and manually actuated means to move said plunger against the action of the spring.

14. The apparatus of claim 1 in which said means actuated by said landing means comprises a pivoted cam lever on the safety valve device and connected to said landing mechanism, a slidable plunger, a pivoted lever for moving said slidable plunger, a spring loaded link for operating said control valve from said plunger and manually actuated means to hold said safety valve device from safety position against the action of said actuating mechanism.

15. The apparatus of claim 1 in which the means to move said safety device to safety position comprises a spring actuated mechanism and means to hold said safety mechanism manually from safety position against the action of said spring.

16. The apparatus of claim 1 in which said means actuated by said landing mechanism to move said safety device comprises a cam operated by the landing mechanism, a plunger actuated from said cam, a lever actuated by said plunger and connected to said valve to open said valve when said plunger is actuated to safety position and manually operable means to move said plunger to open position and a spring acting against said manually operable means.

GEORGE EDWARD BEHARRELL.
JOSEPH WRIGHT.
HENRY TREVASKIS.